Patented Jan. 21, 1947

2,414,759

UNITED STATES PATENT OFFICE 2,414,759

RECONDITIONING OF OLEFIN HYDRATION ACID

Henry O. Mottern, Hillside, N. J., assignor, by mesne assignments, to Standard Alcohol Company, a corporation of Delaware No Drawing. Application August 6, 1942, Serial No. 453,853

3 Claims. (Cl. 23—172)

The present invention relates to the field of olefin hydration, particularly where acids are used as an intermediate agent for securing the hydration of the olefins and more particularly to sulfuric acid and the processes involving the use of sulfuric acid as an absorption agent for olefins which are to be hydrated.

Olefins are most often hydrated to alcohols although ethers may also result from a process involving olefin hydration. Olefin hydration processes in brief using the product of alcohol as the example consists in the absorption of olefin in 60–98% sulfuric acid or other similar absorption agent which forms an extract of alkyl acid esters. The extract is then diluted with water to an acid concentration of 35–50% acid strength on an olefin-free or alcohol-free basis, hydrolyzed and steam stripped to recover alcohol. Such a process is particularly applicable to the manufacture of secondary aliphatic alcohols, although it is also used for preparing primary and tertiary alcohols. The concentrations of the absorption media vary according to the olefin to be absorbed, i. e. ethylene requires about 98% sulfuric acid for absorption, propylene about 88–92% acid, higher molecular weight normal olefins about 80–88% acid and the tertiary olefins require acid concentrations between 60–80%. For the hydrolysis of the acid extracts derived from these olefins, the extract in every instance is diluted to an acid concentration between 35 and 50%.

During the absorption step in the process in which the alkyl acid esters are formed there are also formed other materials which have been roughly classified in the art as tars. When the extract is diluted to the proper acid concentration, permitted to hydrolyze and then distilled, these so-called tars are thrown out of solution. The tar forms as the result of some chemical reaction during the process, and since tars occur even when pure olefins are absorbed, hydrolyzed and distilled, it is a natural conclusion that they result from a chemical reaction involving olefins. It is also natural to conclude that the formation of tar represents a loss of olefinic material which might have been converted to alcohol but for the tar formation. It has also been observed that alcohol is soluble in the tar to a considerable extent and is not wholly recovered therefrom by distillation. The tars are known to contain varying amounts of sulfur which represent losses in sulfuric acid. In addition to material losses, the presence of tars affect operating difficulties in that they foul the equipment, thus reducing efficient heat transfer as well as causing low operating efficiency through frequent idle periods for cleaning the equipment.

The residue from the distillation step is a weak acid, commonly designated as slop acid, having an acid concentration of from 35–50% on an alcohol-free basis and in the ordinary operation of an olefin hydration plant this slop acid is then put through a recovery process in which it is first concentrated under atmospheric pressure to an acid concentration of 83–93% and then oxidized or bleached after which it is in condition for recycle to the olefin-hydration process proper. This oxidizing and bleaching step is for the purpose of removing the carbonaceous material present in the acid which tends to darken and discolor the acid and which, if not removed prior to recycling, may act as a deterrent to absorption of olefin in the absorption chamber or low operation efficiency, due to frequent idle periods due to necessary cleaning of equipment. Each recycle of the acid results in further loss of materials through tar formation.

The principal object of this invention is to so recondition the residual acid from an olefin hydration process that upon recycling the reconditioned acid through the olefin hydration process no further tar is formed. This and other objects of the present invention will be apparent to those skilled in the art upon reading the following description.

According to the present invention the sulfuric acid used in absorbing the olefins to form the sulfuric esters of the corresponding alcohol is processed in a manner to obtain in the acid a small quantity of organic material which prevents the formation of tar intermediates during olefin absorption and tar formation during hydrolysis of esters to alcohols and the distillation of the alcohols from the weak acid solution. This result can be accomplished by pressure distilling the residual weak acid from an olefin hydration process until the acid concentration of weak acid of 35–50% acid strength has been increased by from 2 to 5% and then vacuum distilling the weak acid to the desired acid concentration of 60–98% acid strength on an olefin-free basis. Pressure distillation with steam may also be used to remove the volatile organic material, formed on hydrolysis of sulfonic acids, without increasing the acid strength provided the weight of steam used is equivalent to 5–8 weight per cent of the acid charged. This result can also be accomplished by extracting the organic material which inhibits tar formation from a slop acid by means of a phenolic solvent, such as phenol, cresilic acid, etc., removing the phenolic solution from the acid, distilling off the solvent and adding the residue to an acid which is to be used in the absorption of olefins to form olefin hydration products.

In general, when processing a weak sulfuric acid from an olefin hydration process the acid is first pressure distilled at a temperature of 350°–400° F. for from 1 to 5 hours, although usually 3 hours is found to be the optimum time. The pressure used varies in accordance with the acid concentration being 100 lbs./sq. in. gauge for 35% acid and 50 lbs./sq. in. gauge for 55% acid, or, in other words, the pressure used is approximately equal to the vapor pressure of the particular acid at the temperature employed. During this pressure distillation the carbon concentration in the acid is reduced by the amount of material taken overhead and the concentration of the acid on an olefin-free basis is increased from 2 to 5%. The purpose of the pressure distillation is to remove all volatilizable organic material such as alcohols and sulfonic acids leaving in the acid from 0.05% to 0.25%, based on 100% sulfuric acid of a resinous non-saponifiable oxygenated sulfuretted organic material. This resinous organic material which is retained in the pressure distilled acid contains the elements of carbon, hydrogen, oxygen and sulfur, and acts as an inhibitor during subsequent olefin absorption, inhibiting the formation of tar intermediates in an absorption chamber and tar formation during the hydrolysis of alkyl acid esters and the distillation of the resulting hydrolysis products. The weak acid is then distilled under a vacuum of from 5 to 25 mm. of mercury to the acid concentration desired for the purpose to which the restored acid is to be employed. Vacuum concentration of the pressure treated weak acid is necessary to prevent excessive decomposition of the inhibiting resin. A slight amount of decomposition of the inhibiting resin during vacuum concentration can be tolerated since an acid containing as little as .05% based on 100% sulfuric acid of the resin calculated as carbon has been found to be effective in the inhibition of tar formation. After the acid has been vacuum concentrated to the desired acid strength, it will be found to possess a total carbon content of from .10% to .3% depending upon the source from which the weak acid was derived and upon the final acid concentration. This total carbon content is partially precipitatable carbon and partially soluble carbon and the proportion of soluble carbon represents the inhibitor content of the reconditioned acid. Usually about 35% of the total carbon content in the reconditioned acid is present as soluble carbon although this percentage may range from as little as 15% to as much as 40%. Expressed as percentage on the basis of an acid, the soluble carbon will be found to range between .05% and .1%. The acid thus reconditioned is ready for recycling to an absorber. The utilization of this method for the reconditioning and concentrating of weak acid will effectively prevent a formation of tar-like material in the hydrolysis and stripping operations of an olefin hydration process, and, moreover, inhibitors preserved in the recycle acid are effective in preventing tar formation without thought being given to the type or character of olefin to be absorbed.

Each time that the acid negotiates the cycle through the absorber, hydrolyzer, stripper, pressure still, and vacuum concentrator there is some loss of acid. This loss can be partially but not wholly accounted for by the conversion of acid to sulfonic acids and $SO_2$. This loss in acid ranges from as little as 1% up to as much as 15% during each cycle and must be made up by the addition of fresh acid to the absorber. Although fresh acid alone will produce tar in the hydrolyzer and stripping still, the addition of as much as 20% fresh acid as make-up does not affect the process of the present invention or cause the formation of tar in the hydrolyzer and absorber.

The following example will serve to illustrate and provide a better understanding of the invention.

Example

A quantity of 88% (C. P.) sulfuric acid, about 500 parts by weight, was used to absorb the norbutenes from a liquid hydrocarbon consisting predominantly of $C_4$ hydrocarbons. After the sulfuric acid had absorbed sufficient butenes to yield a rich acid extract, the passage of $C_4$ hydrocarbons through the acid was stopped. The acid extract was then diluted with water to yield a 40% acid, and placed in a packed-tower stripping still. The alcohol was then distilled off using open steam to furnish the heat. Sufficient tar was formed to foul the still. From the amount of tar formed it was determined that .3% of the olefin absorbed had been lost in the formation of the tar. The weak acid from the stripping still was then charged to a pressure still, heated to 350°–400° F. for a period of 3 hours. The pressure variation during this time was between 65 and 75 pounds per square inch gauge. 100 parts by weight of distillate were recovered. The acid was then concentrated under a vacuum of 15 mm. of mercury to an acid concentration of 88%. This reconcentrated acid was then charged to an absorption tower and saturated with normal butenes from a $C_4$ hydrocarbon gas. The resulting extract was hydrolyzed and steam stripped as before, but no tarry material was deposited in the still. The concentration of tar inhibitor in the acid recycled in the absorber was .06–.10% based upon the acid present in the recycle acid calculated as 100%.

I claim:

1. An olefin hydration process in which slop acid is reconditioned for reuse as an olefin absorbent which comprises heating the slop acid at 350–400° F. under the vapor pressure of acid at these temperatures for at least 1 hour under conditions such that the volume of said acid is not reduced by more than 5% and then concentrating said acid under a pressure of from 1–25 mm. of mercury to an acid concentration adapted to absorb olefin hydrocarbons to form alkyl esters and returning the reconditioned acid to the olefin hydration process.

2. An olefin hydration process in which slop acid is reconditioned for reuse as an olefin absorbent which comprises heating the slop acid at 350–400° F. for from 1–5 hours under the vapor pressure of said acid at these temperatures and maintaining the conditions so that the volume of said acid is not reduced by more than 5% and then concentrating said acid under a pressure of from 1–25 mm. of mercury to an acid concentration adapted to absorb olefin hydrocarbons to form alkyl esters and returning the reconditioned acid to the olefin hydration process.

3. An olefin hydration process in which slop acid is reconditioned for reuse as an olefin absorbent which comprises heating the slop acid at 350–400° F. for 3 hours under the vapor pressure of said acid at these temperatures and maintaining the conditions so that the volume of said acid is not reduced by more than 5% and then concentrating said acid under a pressure of from 1–25 mm. of mercury to an acid concentration adapted to absorb olefin hydrocarbons to form alkyl esters and returning the reconditioned acid to the olefin hydration process.

HENRY O. MOTTERN.